Oct. 8, 1968  B. P. SHILLER  3,404,965
FUME COMBUSTION APPARATUS
Filed Nov. 13, 1964  3 Sheets-Sheet 3
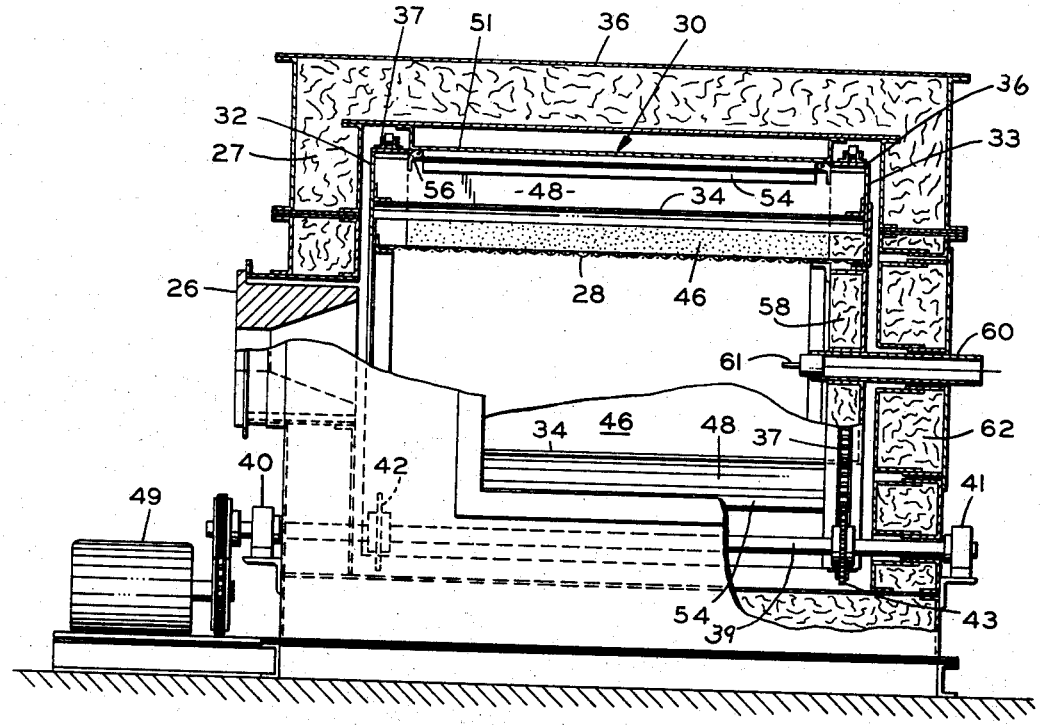
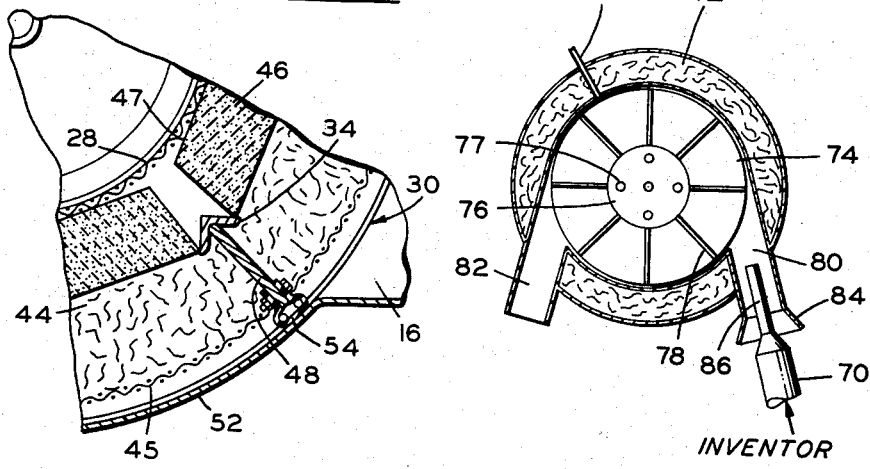
INVENTOR
BENJAMIN P. SHILLER
BY
Farley, Forster & Farley
ATTORNEYS

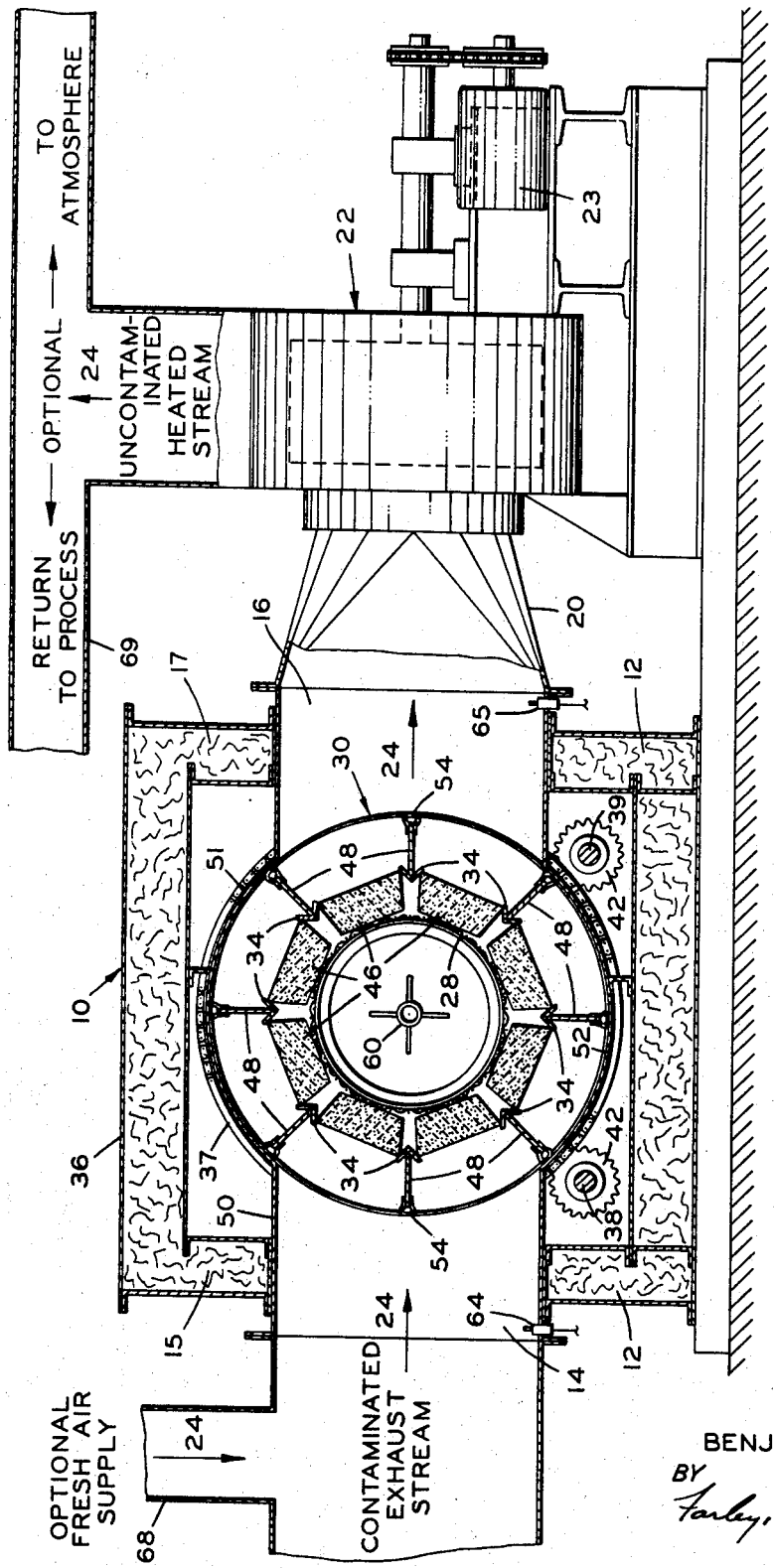

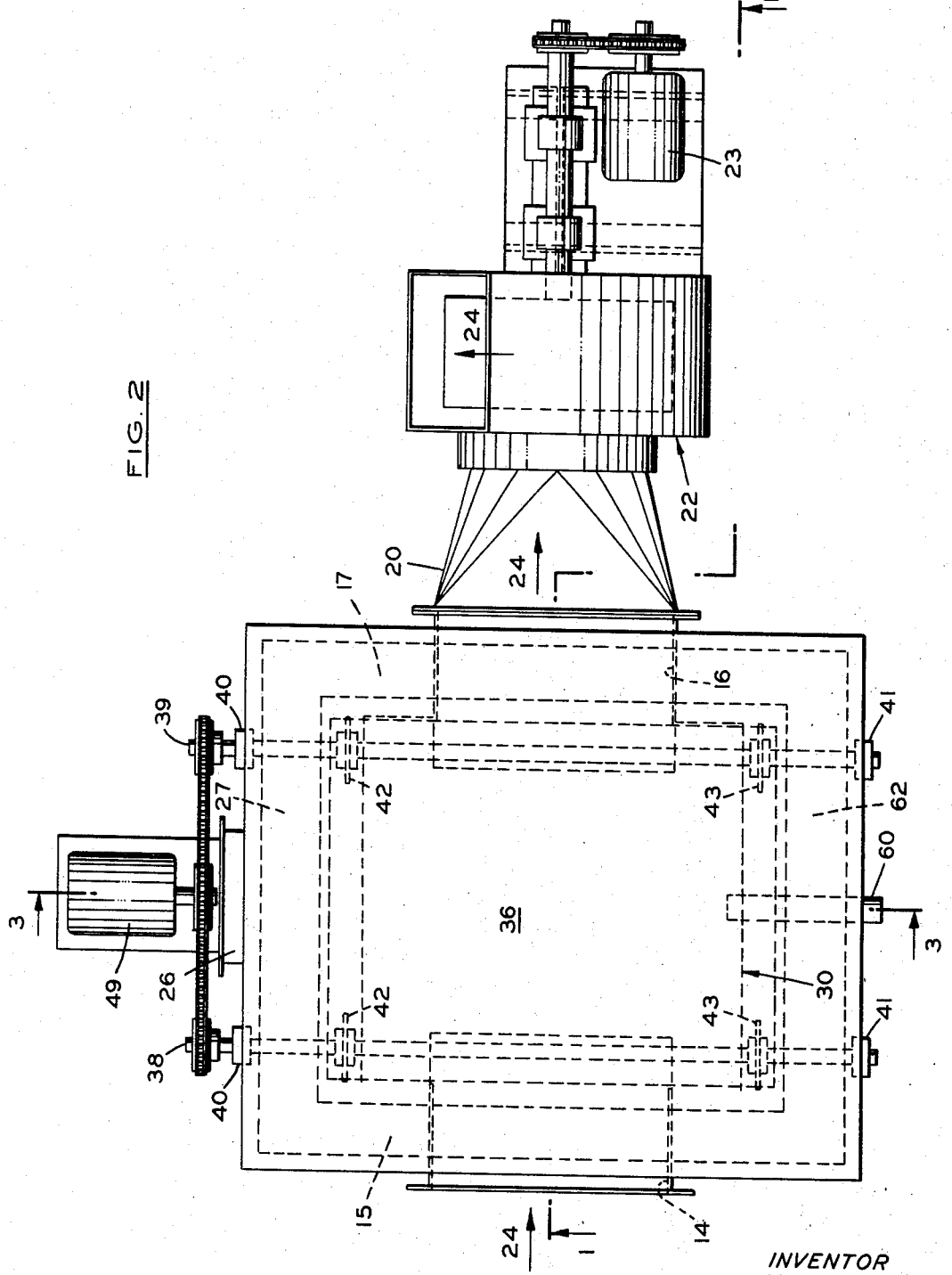

United States Patent Office 3,404,965
Patented Oct. 8, 1968

3,404,965
FUME COMBUSTION APPARATUS
Benjamin P. Shiller, 19123 Greenwald Drive,
Southfield, Mich. 48075
Filed Nov. 13, 1964, Ser. No. 410,909
14 Claims. (Cl. 23—288)

ABSTRACT OF THE DISCLOSURE

Apparatus for oxidizing combustible contaminants in an exhaust gas whereby, a fume combustion apparatus incorporating a regenerative type of heat exchanger mounted for rotation on an axis passing through the combustion chamber and a means for dividing the heat exchanger into a plurality of gas flow passages, is combined with a combustion chamber in such a way that fuel requirements for maintaining combustion of fumes in the combustion zone are reduced to minimum levels.

---

This invention relates to improvements in apparatus for oxidizing combustible contaminants in an exhaust gas, particularly apparatus of the heat regenerative type wherein the heat of combustion or oxidation is employed to raise the temperature of exhaust gases entering the apparatus and thereby reduce the energy requirement for maintaining combustion within the apparatus.

Examples of waste gas streams which may be purified of oxidizable components by employing the apparatus of the invention include the exhaust from paint spray booths, kettle cooking operations, industrial ovens used for baking, oxidizing, polymerizing or removing coatings, organic waste incinerators, foundry cupolas and internal combustion engines. Hydro-carbon type combustible contaminants in such waste gas streams, which will be referred to for convenience as fumes, can be effectively eliminated by employing the customary three elements of combustion, namely, time, temperature and turbulence to generate innocuous products of combustion; essentially carbon dioxide and water, and inert air components. Sulfur or halogen type contaminants can be oxidized in this apparatus but may require subsequent additional treatment to render these innocuous. In many instances, the most critical of these three factors is temperature in the sense that the amount of fuel or other energy which must be supplied to the waste gas stream to raise it to and maintain it at a temperature sufficiently high for the combustion of the fumes when in low concentration, is so great that the cost of purifying the waste gas stream is commercially impractical.

The principal object of the present invention is to provide a fume combustion apparatus incorporating a regenerative type of heat exchanger combined with a combustion chamber in such a way that fuel requirements for maintaining combustion of fumes in the combustion chamber zone are reduced to minimum levels.

A further object of the present invention is to provide a method of purifying a contaminated exhaust stream from a fuel consuming industrial process by supplying additional fresh air to the exhaust streams as required for the oxidation of fumes therein, passing the stream through a regenerative type of fume combustion apparatus to oxidize the fumes and heat the stream, and returning at least some portion of the heated stream to the industrial process to reduce the fuel requirements thereof.

Heat regenerative fume combustion apparatus constructed in accordance with the invention includes a casing having gas inlet and outlet openings therein, combustion chamber means in the casing between the inlet and outlet openings, a heat exchanger mounted for rotation on an axis which passes through the combustion chamber, and means for dividing the heat exchanger into a plurality of gas flow passages, each flow passage having an inlet portion and an outlet portion adapted to extend respectively between the inlet opening and the combustion chamber and between the combustion chamber and the outlet opening when the heat exchanger is in one position of rotation about its axis; and means for rotating the heat exchanger to successively position the flow passages thereof between the inlet and outlet openings of the casing and to reverse the relation of the inlet and outlet portions of a flow passage whereby the outlet portion of a flow passage which has been heated by gases discharged from the combustion chamber becomes an inlet portion of a flow passage to pre-heat gases entering the combustion chamber from the inlet opening of the casing as the heat exchanger is rotated from one position to another.

This construction enables the time, temperature and turbulence required for complete oxidaiton of fumes in the exhaust gas stream to be regulated as a function of the volume of exhaust gas supplied to the apparatus in a given interval, the heat supplied to the combustion chamber, and the speed of rotation of the heat exchanger.

Further control can be obtained by the employment of a suitable refractory or metallic form of oxidation catalyst mounted in a gas permeable layer surrounding the combustion chamber.

Other features and advantages of the construction will be brought out in the following description of the representative embodiments of the invention disclosed in the accompanying drawings in which FIGURE 1 is a sectional elevation of the apparatus including a fan for moving exhaust gases therethrough taken as indicated by the line 1—1 of FIG. 2;

FIGURE 2 is a plan view of the apparatus shown in FIG. 1;

FIGURE 3 is a sectional elevation of the apparatus taken as indicated by the line 3—3 of FIG. 2;

FIGURE 4 is an enlarged sectional detail showing the construction of one of the baffle members of the heat exchanger;

FIGURE 5 is a transverse sectional elevation showing an alternate construction; and FIGURE 6 is a schematic control diagram.

The apparatus shown in FIGS. 1–4 includes a casing 10 having inner and outer walls formed of suitable sheet metal and structural members with a layer of insulating material 12 between the inner and outer walls. An inlet opening 14 is formed in one of the casing side walls 15 and an outlet opening 16 is formed in the opposite side wall 17, the inlet and outlet openings 14 and 16 being preferably of the same size and aligned with each other. A section of duct 20 connects the outlet opening to the inlet side of a conventional blower 22 driven by a motor 23 for moving the exhaust stream through the casing as indicated by the arrows 24.

Means are provided between the inlet and outlet openings 14 and 16 of the casing to form a combustion chamber including an oil or gas fired burner 26 (FIG. 3) mounted in the casing side wall 27 and within the central tubular core portion 28 of a heat exchanger 30. Alternately, an electric resistance type heating element may be used.

The heat exchanger consists of a pair of ring-shaped end portions 32 and 33 connected together by a plurality of circumferentially spaced angle section members 34 and by the tubular core member 28 which may consist of preformed ceramic membrane or a clyindrical perforated plate of high temperature corrosion resistant stainless steel or Nichrome woven wire mesh, but in any event is gas pervious. Each of the end portions 32 and 33 are preferably of double-walled insulated construction as shown and include an outer rim plate 36 to which a continuous strand of sprocket chain 37 is secured.

The heat exchanger is supported within the casing on a pair of parallel shafts 38 and 39, each of which extends through apertures in the casing side walls, as shown in FIG. 3, and has its ends supported in a pair of bearings 40 and 41 mounted externally of the casing. Each of the shafts is also provided with a pair of sprockets 42 and 43 which engage the sprocket chains 37 at the ends of the heat exchanger so that the heat exchanger is cradled between the shafts 38 and 39 for rotation on an axis which is preferably aligned with the center of the burner 26 of the combustion chamber. In the construction shown, where the combustion chamber is in part defined by the structure of the heat exchanger itself, namely the cylindrical core member 28 thereof, the axis of rotation of the heat exchanger coincides with the center of the combustion chamber; but in a broader sense the object of the invention will be attained as long as the axis of rotation of the heat exchanger extends through the combustion chamber.

The structure of the heat exchanger further includes a gas pervious matrix portion which surrounds the combustion chamber and which in the construction shown consists of a plurality of porous ceramic blocks 46. Each block is mounted between an adjacent pair of the angle members 34 which act to retain the inner face 47 of the block against the outer surface of the cylindrical member 28. The matrix portion may also consist of or additionally include any of the well known ceramic or metallic catalyst materials in any form or as a coating on the member 28 or ceramic blocks 46. Such catalyst materials may also be mounted stationary in the combustion chamber within the rotary heat exchanger structure.

Outwardly of the matrix portion the heat exchanger structure includes a plurality of baffles or divider members 48 as best shown in FIGS. 1 and 4, each baffle member 48 being secured between the end portions 32 and 33 and to one of the angle members 34.

In some instances it may be desirable to increase the area of the matirx portion by the installation of woven or knitted wire mesh 44 (FIG. 4) between the ceramic blocks 46 and an outer perforated retainer 45 mounted between adjacent baffles 48. The amount of matrix material used naturally depends upon the amount of heat exchange required to raise the temperature of the exhaust stream.

Air flow between the inlet and outlet openings 14 and 16 of the casing is directed through the heat exchanger by the provision of sheet metal ducting 50 which as shown in FIG. 1 includes upper and lower arcuate portions 51 and 52 extending around that portion of the periphery of the heat exchanger between the inlet and outlet passages, As shown in FIG. 4, the arcuate portions 51 and 52 are contacted by a sealing strip 54 of a double bulbous type which is secured to the outer end of each of the baffles 48. These sealing strips 54 are flexible and have a bi-directional sealing action which is augmented by the pressure differential created by the flowing gas stream across each baffle member 48. As shown in FIG. 3, the duct portions 51 and 52 are also engaged by a single continuous bulb-type gasket 56 secured to each of the heat exchanger end portions 32 and 33.

A circular apertured end wall 58, best shown in FIG. 3, is employed to close the end of the combustion chamber portion of the heat exchanger opposite to the burner 26. A tubular sleeve 60 extends through the end wall 58 and is mounted in the adjacent side wall portion 62 of the casing to provide for the installation of suitable equipment 61 for sensing the operating temperature within the combustion chamber. This temperature sensing equipment is employed in conjunction with suitable controls for regulating the amount of fuel supplied to the burner 26.

When a contaminated exhaust stream is drawn through the heat exchanger unit by the blower 22 and fume combustion takes place in the combustion chamber, the matrix surrounding the combustion chamber will be heated, especially that portion thereof between the combustion chamber and the outlet opening 16 as the combustion process supplies heat to the exhaust stream. Adjacent pairs of the baffles 48 divide the heat exchanger into a plurality of gas flow passages, and as the heat exchanger is rotated the relation of the flow passages with respect to the inlet and outlet openings 14 and 16 is reversed. Flow passages between the combustion chamber and exhaust opening 16, which have been receiving the most heat from the combustion process, and have been acting as outlet passages, have their role reversed and act as inlet passages, preheating the exhaust gases entering the combustion chamber.

This continuous transfer of heat from the exhaust to the inlet side of the combustion process, together with the heat exchanger being constructed so as to surround the combustion chamber results in maximum heat transfer and minimum heat loss. Fuel requirements for the combustion process are lowered and commerically economical.

Control over the heat exchanging function is readily obtained so that the combustion process will continue and the apparatus operate within desired temperature limits. Temperature sensing elements 64 and 65 (FIG. 1) may be installed in the inlet and outlet passages 14 and 16 respectively. These elements 64 and 65 are employed with a differential temperature controller 66 (FIG. 6) to regulate the speed of the heat exchanger drive unit 49 and vary the efficiency of the heat exchanging process as fume concentrations change.

Those skilled in the art will appreciate from a study of the apparatus that its construction and arrangement permits greater preciseness of control over the elements of temperature, turbulence and time. This results from the arrangement of the combustion chamber being surrounded by a rotary regenerative type of heat exchanger and the fact that control over the speed of rotation thereof will result in additional control over the three elements of combustion. Consequently fumes can be removed to a degree such that the stream leaving the apparatus of the invention is virtually uncontaminated, is heated, and instead of being exhausted to the atmosphere may be returned in whole or in part to the industrial process with which the apparatus is used, if that process is a fuel consuming one. The heated uncontaminated stream may also be returned to the building for space heating if desired. Thus the fuel requirement of other apparatus with which the apparatus of the invention is operating can be reduced with a further saving and overall fuel cost.

An example of this type of operation is schematically illustrated in FIG. 1. Assume for example, that the contaminated exhaust stream entering the apparatus of the invention is being drawn from an industrial process such as a foundry cupola and is contaminated principally by carbon monoxide. Fresh air must be supplied through a passage 68 in order to make the exhaust stream a combustible mixture. This will reduce the temperature of the exhaust stream entering the fume combustion apparatus and hence will require more fuel to be supplied for fume combustion. However, this additional fuel requirement can be largely offset by the step of returning the uncontaminated heated stream leaving the fume combustion apparatus through a passage 69 to the tuyeres of the cupola, thus reducing the fuel requirement there. In effect the fresh air required for operation of the cupola, instead of being supplied directly there, is drawn through the fume combustion apparatus to aid in decontaminating the cupola exhaust and then supplied to the cupola in heated state rather than at ambient temperature.

FIG. 5 schematically illustrates another possible construction of the fume combustion apparatus of the invention and one having application to the decontamination of the exhaust stream from an internal combustion engine. Such an exhaust stream is deficient in oxygen and usually travels at relatively high velocity through the pipe 70.

The combustion apparatus includes a cylindrical insulated casing 72, a rotary heat exchanger 74 mounted therein, a central combustion chamber 76 and means for supplying heat thereto such as the electrical resistance elements 77. The heat exchanger 74 is separated into a plurality of flow passages leading to and from the combustion chamber by a series of radially extending baffles 78. Inlet and outlet passages 80 and 82 are arranged in generally tangential gas flow relation to the axis of rotation of the heat exchanger 74. The inlet passage 80 is provided with a venturi portion 84 and the exhaust pipe 70 is provided with an inspirator 86. Thus a combustible mixture of exhaust gas and air is formed in the inlet opening 80 and impinges against a baffle member 78 of the heat exchanger with sufficient kinetic energy to produce rotation thereof. If desired, means in the form of a friction brake element 88 may be used to control the speed of the heat exchanger 74.

Fume combustion operation of this form of apparatus is otherwise the same as the apparatus shown in FIGS. 1–4 and previously described and therefore further description is not believed necessary.

While preferred embodiments have been described above in detail, it will be understood that numerous modifications might be resorted to without departing from the scope of the invention as defined in the following claims.

I claim:
1. A heat regenerative type of fume combustion apparatus for burning combustible matter in a gas comprising:
   (a) means forming a casing;
   (b) gas inlet and outlet openings in the casing;
   (c) combustion chamber means in the casing between the inlet and outlet openings;
   (d) a heat exchanger, means mounting the heat exchanger for rotation on an axis which passes through the combustion chamber, and means for dividing the heat exchanger into a plurality of gas flow passages, each flow passage having an inlet portion and an outlet portion adapted to extend respectively between the inlet opening and the combustion chamber and between the combustion chamber and the outlet opening when the heat exchanger is in some position of rotation about its axis; and
   (e) means for rotating the heat exchanger to successively position the flow passages thereof between the inlet and outlet openings and to reverse the relation of inlet and outlet portions of a flow passage with respect to the inlet and outlet openings and to the combustion chamber whereby the outlet portion of a flow passage which has been heated by gases discharged from the combustion chamber becomes an inlet portion of a flow passage to pre-heat gases entering the combustion chamber from the inlet opening as the heat exchanger is rotated from one position to another.

2. A heat regenerative type of fume combustion apparatus as claimed in claim 1 further comprising means for supplying heat to the combustion chamber.

3. A heat regenerative type of fume combustion apparatus as claimed in claim 1 wherein said gas inlet and outlet openings are arranged on either side of the axis of rotation of the heat exchanger, and wherein the means for dividing the heat exchanger into a plurality of flow passages comprises a series of baffles extending radially of the axis of rotation and spaced circumferentially around the axis of rotation.

4. A heat regenerative type of fume combustion apparatus as claimed in claim 1 wherein said combustion chamber means includes a tubular gas permeable member forming part of the structure of said heat exchanger and mounted substantially concentric with the axis of rotation thereof.

5. A heat regenerative type of fume combustion apparatus as claimed in claim 4 wherein the tubular gas permeable member includes a catalyst material.

6. A heat regenerative type of fume combustion apparatus as claimed in claim 1 wherein said heat exchanger comprises a substantially drum-like structure having a central tubular gas permeable matrix portion mounted substantially concentric with the axis of rotation thereof and a plurality of baffle members each extending longitudinally of said axis and radially outward thereof in spaced relation to divide the heat exchanger into said plurality of flow passages.

7. A heat regenerative type of fume combustion apparatus as claimed in claim 6 further characterized by gas sealing means between the casing and the heat exchanger.

8. A heat regenerative type of fume combustion apparatus as claimed in claim 7 wherein the sealing means includes a sealing strip carried by each of the baffle members.

9. A heat regenerative type of fume combustion apparatus as claimed in claim 6 further characterized by combustion controlling means mounted in said heat exchanger in the said central tubular matrix portion thereof.

10. A heat regenerative type of fume combustion apparatus as claimed in claim 6 further characterized by means for supplying heat to the interior of said central tubular portion of the heat exchanger to maintain the temperature thereof at the combustion level of said combustible matter.

11. A heat regenerative type of fume combustion apparatus as claimed in claim 1 wherein the means for rotating the heat exchanger comprises a pair of shafts extending through said casing, means rotatably supporting each of said shafts exteriorly of said casing, said heat exchanger including a pair of circular end portions cradled between said shafts, and means for rotating at least one of said shafts whereby rotation is imparted to the heat exchanger cradled thereon.

12. A heat regenerative type of fume combustion apparatus as claimed in claim 11 further characterized by gear means between said one shaft and the heat exchanger.

13. A heat regenerative type of fume combustion apparatus as claimed in claim 1 wherein said means for rotating the heat exchanger includes a generally tangential relation between the gas flow defined by said inlet opening and the axis of rotation of said heat exchanger.

14. A heat regenerative type of fume combustion apparatus as claimed in claim 1 further characterized by means for controlling the speed of rotation of the heat exchanger including heat sensing elements in the incoming and outgoing gas flow stream.

References Cited

UNITED STATES PATENTS 2,715,569   8/1955   McKinney     23—288
2,996,143   8/1961   Beasley     23—277

JOSEPH SCOVRONEK, *Primary Examiner.*

M. D. BURNS, *Assistant Examiner.*